Nov. 6, 1951 M. E. BIVENS 2,574,374
HALF CYCLING PROTECTIVE AND INDICATING SYSTEMS
Filed Aug. 17, 1950 2 SHEETS—SHEET 1

Fig. 1.

Inventor:
Maurice E. Bivens,
by Claude A. Holt
His Attorney.

Nov. 6, 1951 M. E. BIVENS 2,574,374
HALF CYCLING PROTECTIVE AND INDICATING SYSTEMS
Filed Aug. 17, 1950 2 SHEETS—SHEET 2

Inventor:
Maurice E. Bivens.
by *Claude A. Mott*
His Attorney.

Patented Nov. 6, 1951

2,574,374

UNITED STATES PATENT OFFICE 2,574,374

HALF CYCLING PROTECTIVE AND INDICATING SYSTEMS

Maurice E. Bivens, Schenectady, N. Y., assignor to General Electric Company, a corporation of New York Application August 17, 1950, Serial No. 179,964

19 Claims. (Cl. 175—294)

My invention relates to half cycling protective and indicating systems.

It is often desirable and in fact some time necessary to provide an indication of half cycling operation of a system which is intended to operate with full cycle energization and to provide means for interrupting the operation of such a system when it fails to supply consecutive half cycles of alternating current to a load device. An example of this is found in resistance welding where the welding transformer is fed from alternating current supply conductors through a circuit controlling means which during normal operation supplies consecutive half cycles of alternating current to the welding transformer.

In resistance welding systems one common form of circuit controlling means comprises a pair of reversely connected electric valve means which when rendered alternately conducting transmit consecutive half cycles of alternating current to the welding transformer. If, due to aging or breakdown from some other cause, one of the electric valve means fails to conduct current when excited for such conduction, half cycles of alternating current of only one polarity are fed to the welding transformer causing it to saturate its magnetic circuit due to the unidirectional character of its resulting energization. This will result in a decrease in the impedance of the load circuit and a consequential imposition of an overload current flow in the remaining effective electric valve means which is supplying the half cycles of alternating current of one polarity. Furthermore, the welding transformer will no longer function properly in accordance with its previous setting which was based on full cycle energization for a predetermined time and the welds produced during such half cycling of the system will be imperfect. This undesired operating condition may continue for a considerable length of time before being detected if overloading is not severe due to the construction of the welding transformer or if the demand on the system is such that the flow of welding current may be adjusted for longer periods of time to compensate for the half cycling operation. Nevertheless, half cycling operation is undesirable and an indication thereof should be given and in most cases the system should be shut down and the fault corrected whenever this condition occurs.

It is an object of my invention to provide an improved half cycling protective and indicating system which will not only indicate half cycling operation of the system but will also shut the system down when such half cycling operation occurs.

Further objects of my invention will become apparent from a consideration of the embodiments thereof illustrated in Figs. 1 and 2 of the drawings. In each of the systems illustrated a visual signal is employed to indicate half cycling operation and a response is secured through the operation of a relay which also gives an indication of this half cycling operation and acts to shut the system down when such half cycling operation occurs. In the system of Fig. 1 a single relay is employed whereas in Fig. 2 a pair of relays are employed so that the selective operation of the pair will indicate which of two electric valve means employed for supplying the alternating current is not conducting and thus causing the half cycling operation.

In accordance with my invention the flow of half cycle current of one polarity in the load circuit is compared with the flow of half cycle current of the opposite polarity by simultaneously operating circuit controlling devices each of which is responsive to half cycles of one polarity. These circuit controlling devices may be electric discharge devices having their anode-cathode circuits connected in a network in which anode-cathode conduction or nonconduction of both of these devices do not disturb the balance of the network whereas conduction of but one of them will disturb the network balance resulting in a voltage difference of distinctive polarity between parts of the network which may be used to operate the signal as well as the relay which responds to half cycling conditions in the load circuit. The simultaneous operation of the electric discharge devices in said network is obtained by delaying the response of one of them by a half cycle relative to the response of the other of them. Thus, the responses to consecutive half cycles of load current flow occur at the same time if the system is not half cycling whereas if one of the electric valve means fail to conduct load current only one of these electric discharge devices will respond to disturb the balance of the network in which they are connected and thus secure the desired indication and control response.

Figure 1:
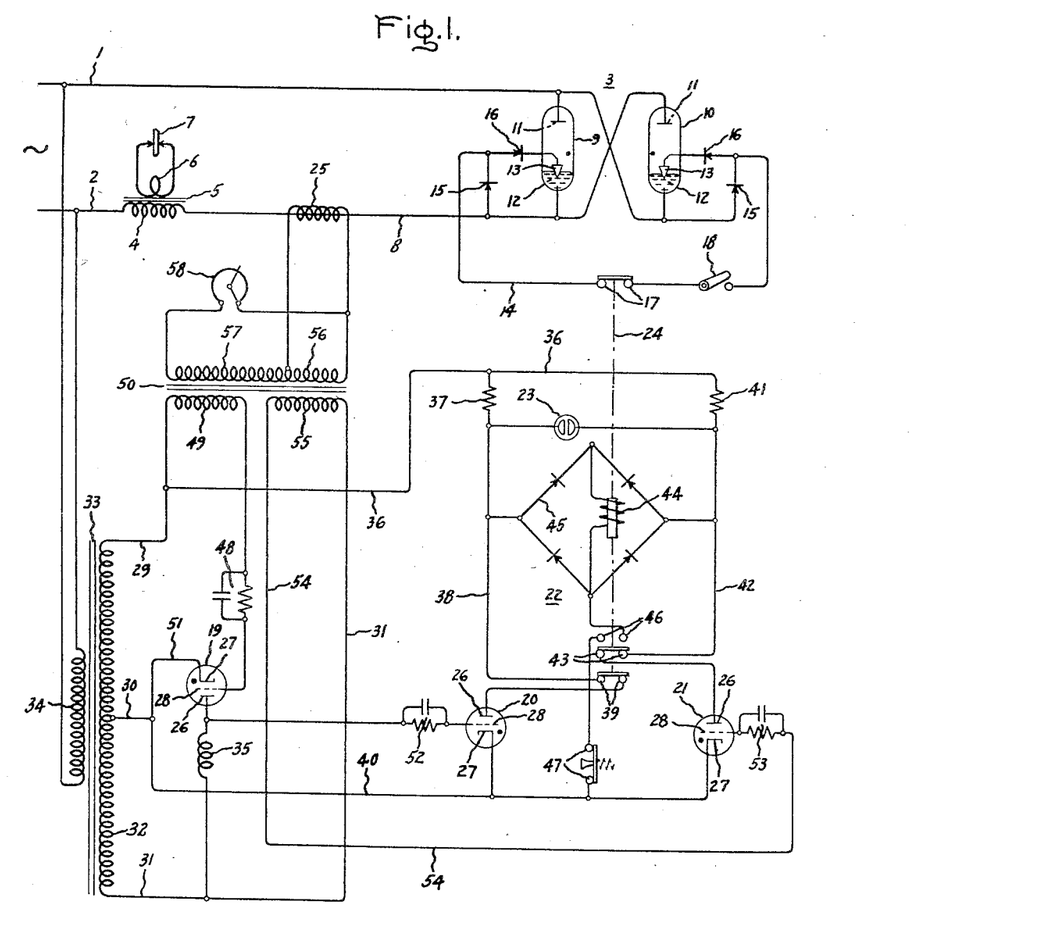

Referring now to the embodiment of my invention shown in Fig. 1 of the drawings alternating current is furnished through supply conductors 1 and 2 and a circuit controlling means 3 to the primary 4 of a welding transformer 5. This welding transformer is provided with a secondary 6 by means of which current is supplied through electrodes, indicated by arrows, to the work 7. In this figure the load conductors comprise the primary connections of the welding transformer with the supply conductors through the circuit controlling means and one of these conductors has been identified in the drawing by the reference numeral 8.

The circuit controlling means 3 comprises a pair of reversely connected electric discharge devices 9 and 10 each of which has an anode 11, a mercury pool cathode 12 and a control member 13. The control member 13 is of the immersion-ignitor type and extends into the pool of mercury constituting the cathode. It is preferably constructed of a material such as a boron carbide or silicon carbide or a mixture of these materials having an electrical resistivity which is high compared with that of the mercury pool cathode into which it extends. The elements of these electric valve means are enclosed within an envelope which confines the mercury vapor generated from the mercury cathodes. These electric valve means are consequently arc discharge devices and as such have been indicated by the dots associated therewith within their envelopes.

Each of the electric valve means 9 and 10 of the circuit controlling means 3 is provided with an excitation circuit 14 which when completed causes them to conduct alternately in accordance with their applied positive anode voltages. The connections of these excitation circuits with the cathodes and ignitor control members of the reversely connected pair of electric discharge devices is such as to prevent reverse current flow through their ignitor control member 13. Thus, each of the ignitor control members is connected to its associated cathode through a pair of rectifiers 15 and 16 which are poled for conduction of current from the cathode to the ignitor control member and the common terminals of each pair of rectifiers 15 and 16 are connected together through pairs of control contacts 17 and 18. Thus, when the supply conductor 1 applies a positive polarity to the anode of the electric valve means 9, the control circuit for this electric valve means is completed through rectifier 15 associated with electric valve means 10, contacts 18 and 17 and rectifier 16 associated with electric valve means 9, control member 13 and cathode 12 of this electric valve means to the other supply conductor 2 through the load circuit. This will initiate conduction of the electric valve means 9 during the half cycle when its anode voltage is positive. In like manner during the next or negative half cycle of supply circuit voltage when the anode voltage of electric valve means 10 is positive, this valve will become conductive due to current flow in its exciting circuit which is from supply conductor 2 through the load circuit conductors, rectifier 15 associated with electric valve means 9, contacts 17 and 18 and rectifier 16 associated with electric valve means 10 and control member 13 and cathode 12 of this electric valve means to the other supply conductor 1. If desired a current limiting resistor, not shown in the drawing, may be inserted in this excitation circuit for these electric valve means. Conduction of the electric valve means is thus dependent upon closure of contacts 18 of a manually operated control switch and contacts 17 which may form part of a relay, the energization of which opens these contacts to interrupt the flow of load current through the electric valve means 9 and 10.

The means responsive to half cycling operation of the power system just described comprises three electric discharge devices 19, 20 and 21. The arrangement is such that electric discharge device 20 conducts in trailing response to conduction of electric discharge device 19 after a half cycle delay, in response to half cycles of current flow of one polarity in the load circuit at the same time that electric discharge device 21 conducts in response to half cycles of current flow of the opposite polarity in the load circuit. These two electric discharge devices 20 and 21 are connected in branches of a network 22 which is balanced when neither or both of these electric discharge devices conduct and which is unbalanced when only one of them conducts to produce a resulting voltage in the network which actuates a visual indicator 23 and a relay 24 having one pair 17 of its contacts in the excitation circuit 14 of the reversely connected electric valve means 9 and 10 above described. The system is made responsive to current flow in the load circuit by being coupled therewith through a current transformer 25. Each of the electric discharge devices 19, 20 and 21 has an anode 26, a cathode 27 and a control element 28 which are enclosed in an envelope which may contain an ionizable gas or vapor as indicated by the dots associated with their cathodes.

The anode-cathode circuits of each of these electric discharge devices 19, 20 and 21 are connected for energization across supply conductors 29, 30 and 31 so that electric discharge device 19 may conduct during half cycles of one polarity and electric discharge devices 20 and 21 may conduct during half cycles of the opposite polarity. This result is obtained by connecting the supply conductors 29 and 31 to the end terminals and supply conductor 30 to the mid terminal of the secondary 32 of a transformer 33 having its primary 34 connected across the load circuit supply conductors 1 and 2.

The anode-cathode circuit of electric discharge device 19 is connected across supply conductors 31 and 30 through an inductance 35 which will cause current flow to continue through the electric discharge device 19 during the early portion of the next half cycle following a half cycle of its positive anode voltage during which its conduction was initiated. This will produce an anode-cathode voltage drop across electric discharge device 19 which is used as a control voltage in the control element circuit of electric discharge device 20.

The anode-cathode circuit of electric discharge device 20 is connected across supply conductors 29 and 30 through a conductor 36, an impedance 37, conductor 38, contacts 39 of relay 34 and conductor 40. In like manner the anode-cathode circuit of electric discharge device 21 is connected across supply conductors 29 and 30 through conductor 36, an impedance 41, conductor 42, contacts 43 of relay 24 and conductor 40. Thus, the circuit through impedance 37 and electric discharge device 20 constitutes one branch of a balanced circuit whose other branch includes the impedance 41 and electric discharge device 21.

The indicator 23 is connected across the balanced circuit 22 by connecting one terminal thereof to the common terminals of impedance 37 and electric discharge device 20 and by connecting the other terminal thereof to the common terminals of impedance 41 and electric discharge device 21. Conveniently, this indicator may be a neon tube since its electrode which is connected to a conductor of negative polarity will glow and thus give an indication of the polarity existing across the terminals thereof.

The operating winding 44 of relay 24 is connected in like manner to the indicator 23 through a rectifier bridge 45 which is provided so that current flow through its operating winding 44 will always be in the same direction whether it is energized by sole conduction of one or the other of the electric discharge devices 20 and 21 or connected directly across the supply conductors through its contacts 46 and the contacts 47 of a reset push button switch which latter circuit is completed whenever the relay picks up.

The control element circuit of electric discharge device 19 extends from its control element 28 through the negative self-biasing circuit 48, secondary 49 of control transformer 50, conductor 29, the upper portion of the secondary 32 of transformer 33 and conductors 30 and 51 to its cathode 27. The voltage induced in the secondary winding 49 of transformer 50 is a turn on voltage which overcomes the hold off bias voltage of the upper portion of the secondary 32 of transformer 33 which normally maintains electric discharge device 19 nonconducting.

A negative hold off bias voltage is applied to the control element 28 of electric discharge device 20 whenever electric discharge device 19 is nonconducting, through a circuit completed from its control element 28 through negative self-biasing circuit 52, inductance 35, conductor 31, the lower half of the secondary 32 of transformer 33 and conductors 30 and 40 to its cathode 27. When, however, electric discharge device 19 is conducting, the anode-cathode voltage drop across this electric discharge device is applied as a turn on voltage to the control element 28 of electric discharge device 20 through a circuit extending from this control element through the negative self-biasing circuit 52, the anode-cathode circuit of electric discharge device 19 and conductors 51 and 40 to the cathode 27 of electric discharge device 20.

Control element 28 of electric discharge device 21 is connected to its cathode 27 through a negative self-biasing circuit 53, conductor 54, another secondary 55 of the control transformer 50, conductor 31, the lower half of the secondary 32 of transformer 33 and conductors 30 and 40 to its cathode 27. The voltage induced in the secondary 55 of transformer 50 is a turn on voltage which overcomes the hold off bias voltage of the lower portion of the secondary 32 of transformer 33 which normally maintains electric discharge device 21 nonconducting.

The secondaries 49 and 55 of control transformer 50 provide control potentials in their respective control element circuits which are responsive to positive and negative half cycles of current flow in the load circuit 8. This result is accomplished by energizing its primary 56 from the secondary terminals of the current transformer 25 referred to above. Primary winding 56 of transformer 25 is extended by section 57 which together with the primary 56 is short circuited through an adjustable resistance 58. The setting of this resistance 58 provides an adjustment of the voltage induced in the secondaries 49 and 55 of the control transformer 50. These induced voltages as pointed out above are turn on voltages for the electric discharge devices 19 and 21 and must be greater than the negative hold off voltage provided for these electric discharge devices by the upper and lower portions of the secondary 32 of transformer 33.

My invention as disclosed in Fig. 1 will be better understood from the following considerations of its operation. In Fig. 1 the initiating or control switch 18 has been shown in its open position and relay 24 in its deenergized position.

Current is supplied to the welding transformer 5 through the electric valve means 9 and 10 from the supply conductors 1 and 2 upon the closure of control switch contacts 18 in the excitation circuit 14 of these electric valve means. Assuming that at the time contacts 18 are closed supply conductor 1 is at positive polarity, electric valve means 9 will conduct due to the energization of its control element circuit as described above. This will supply a positive half cycle of alternating current to the welding transformer 5. The supply of this positive half cycle of load current energizes the control transformer 50 by way of the current transformer 25 and induces control voltages in the secondaries 49 and 55 connected in the control element circuits for electric discharge devices 19 and 21. These electric discharge devices as well as the electric discharge device 20 have anode voltages supplied thereto through transformer 33 whose primary is connected across supply conductors 1, 2. Since it is desired to have the electric discharge devices 20 and 21 conduct for substantially full half cycles in order to provide adequate operating current to the coil 44 of relay 24, the primary connections of transformers 50 and 33 are such as to secure response to the lagging current flow in the load circuit which occurs during the next half cycle of voltage following a half cycle in which the electric valve means 9 became conducting. That is, the anode voltage of electric discharge device 19 is positive during the half cycle immediately following the positive half cycle of anode voltage applied to electric valve means 9 and the polarity of the winding 49 is such as to apply a positive turn on voltage value to the control element 28 of the electric discharge device 19 when the anode voltage of this device is positive. This will result in conduction of electric discharge device 19 at the beginning of the half cycle of voltage following the half cycle when electric discharge device 9 became conducting.

During the negative half cycle voltage of supply conductors 1, 2 which follows the positive half cycle when electric valve means 9 became conducting, electric valve means 10 will become conducting since its anode voltage is then positive. The flow of this negative half cycle of load current will induce a turn on voltage in the winding 55 of control transformer 50 which will render electric discharge device 21 conducting at the beginning of the next half cycle following the half cycle when electric discharge device 19 became conducting. At the same time electric discharge device 20 will become conducting in trailing response to the conduction of electric discharge device 19 since the anode-cathode drop across electric discharge device 19 applied a positive turn on voltage to the control element 28 of electric discharge device 20 due to current flow through the electric discharge device 19 continuing over into the next half cycle because of the inductance 35 in its circuit. Thus, if a positive half cycle of current flow is followed by a negative half cycle of current flow in the load circuit 8 both the electric discharge devices 20 and 21 will be conducting at the same time and connect both terminals of the indicator 23 and both terminals of the operating winding 44 of relay 24 to the negative supply conductor 40 and the indicator will give no indication and the relay will not pick up.

If, however, electric valve means 10 fail to supply the negative half cycle of load current, then electric discharge device 21 will fail to conduct at the time electric discharge 20 becomes conducting in response to the positive half cycle of load current flow. Conduction of electric discharge device 20 completes a circuit through impedance 37 in its anode circuit so that substantially the full voltage across 36 and 40 appears across impedance 37. When this occurs the right-hand electrode of the indicator 23 is connected through impedance 41 to the positive conductor 36 at the same time that the left-hand terminal of the indicator 23 is connected through electric discharge device 20 to the negative conductor 40. This will cause the left-hand electrode of the indicator 23 to glow indicating failure of the electric valve means 10 to conduct and supply a negative half cycle of load current. If on the other hand electric valve means 9 fails to conduct so that only negative half cycles of load current are supplied by the electric valve means 10, then only the electric discharge device 21 becomes conducting and the polarity at the terminals of the indicator 23 is reversed so that its right-hand terminal which is connected to the negative conductor 40 glows and indicates failure of conduction by electric valve means 9.

When only one of the electric valve means 9 and 10 fails to conduct, relay 24 is energized in the same manner as indicator 23. Its operating winding 44 is connected with the supply conductors 36 and 40 through a bridge circuit 45. Because of this bridge circuit, current flows through winding 44 in the same direction irrespective of which of the electric discharge devices 20 and 21 become conducting in the absence of conduction through the other. This pick up of the relay will open its contact 17 in the excitation circuit 14 of the electric valve means 9 and 10 thereby interrupting the flow of half cycle current therethrough to the load circuit. At the same time pick up of the relay will close its contacts 46 completing a holding circuit for its operating winding 44 across conductors 36 and 40 through a circuit including the contacts 47 of a reset push button switch and the impedances 37 and 41.

In the illustrated arrangement, relay 24 is also provided with contacts 39 and 43 which are opened when the relay picks up to open the anode-cathode circuits of electric discharge devices 20 and 21. These contacts are not needed when the contacts 17 of this relay are used to control the excitation circuit 14 of the electric valve means 9 and 10. If on the other hand contacts 17 of relay 24 are used to control a signal circuit for operating a horn, bell or the like, then the provisions of contacts 43 and 39 become useful since the half cycling condition may temporarily disappear resulting in both the electric discharge devices 20 and 21 becoming conducting at the same time and this would de-energize the operating winding 44 of relay 24 by connecting its terminals to one another through the anode-cathode circuits of these electric discharge devices.

Figure 3:
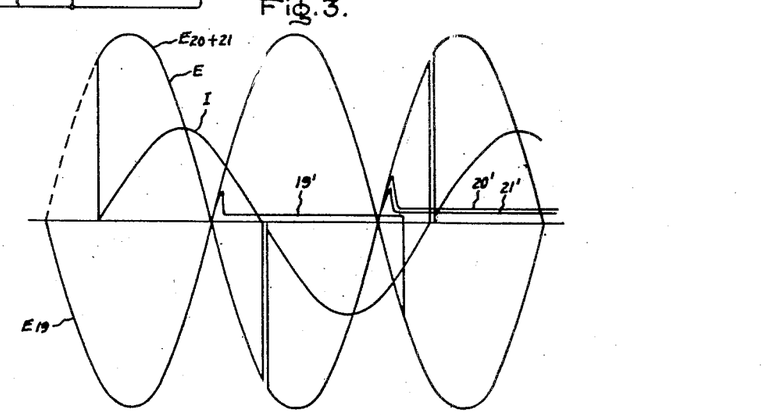
Fig. 3 of the drawings is a graphic representation of certain of the current and voltage values existing in the system and will be referred to in connection with a description of the operation of the systems shown in Figs. 1 and 2.

The operation just described has been graphically presented in Fig. 3 of the drawing wherein the voltage of supply conductors 1 and 2 is indicated by the sine wave E and the load current flow by the sine wave I. The anode voltage applied to electric discharge device 19 is represented by the sine wave $E_{19}$ and the anode voltage applied to the electric discharge devices 20 and 21 has been shown as corresponding in phase and magnitude with the voltage E of the supply conductors 1 and 2. Conduction of electric discharge device 19 indicated by 19' begins at the beginning of a positive half cycle of voltage $E_{19}$ in response to the current flow I which carries over into the negative half cycle of the supply circuit voltage E applied to electric valve means 9 and 10. The carry over of the voltage drop across electric discharge device 19 into its next negative half cycle occurs at a time when the anode voltages applied to electric discharge devices 20 and 21 are positive and results in the conduction of electric discharge device 20 as indicated at 20' at the same time that electric discharge device 21 becomes conducting as indicated at 21' in response to the negative half cycle of current flow in the load circuit carrying over into the next half cycle.

Figure 2:
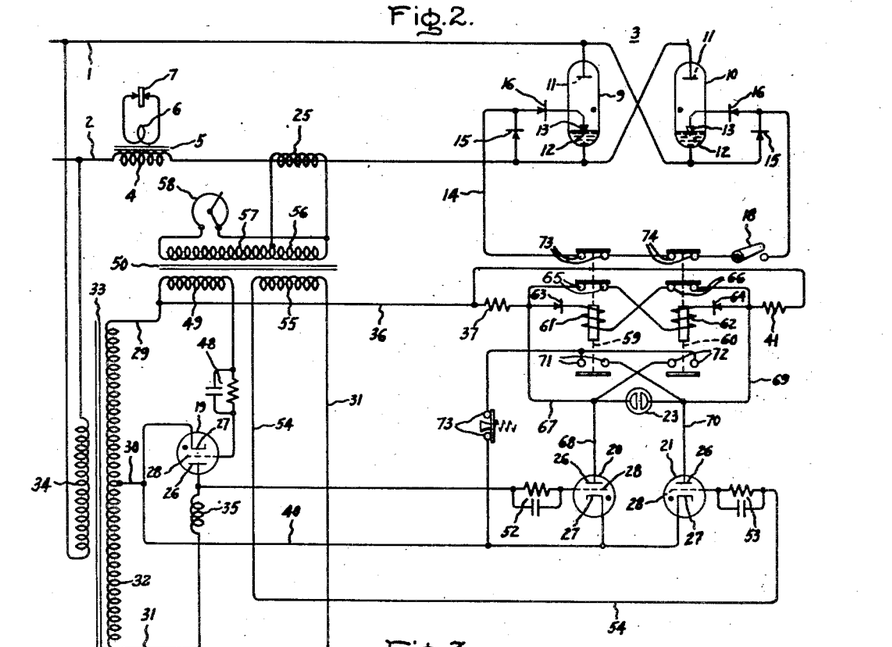

The arrangement shown in Fig. 2 of the drawings differs from that shown in Fig. 1 by providing two relays, the selective operation of which indicates which of the electric valve means 9 and 10 failed to conduct. Consequently, in Fig. 2 like reference numerals have been applied to like parts so as to eliminate redescription of the corresponding parts of the two systems.

The two relays 59 and 60 shown in Fig. 2 each have an operating winding 61 and 62 which is connected across the supply conductors 36 and 40 through polarizing circuits including rectifiers 63 and 64 and the normally closed contacts of the other relay 65 and 66 depending on anode-cathode conduction of electric discharge devices 20 and 21. Thus, relay winding 62 is connected from the positive conductor 36 through impedance 41, rectifier 64, contacts 65 of relay 59 and conductors 67, 68 and the anode-cathode circuit of electric discharge device 20 to the negative supply conductor 40 so that when only electric discharge device 20 of the pair 20 and 21 is conducting relay 60 will be energized for pick up. Under these conditions the winding 61 of relay 59 cannot be energized because of the blocking of its circuit at rectifier 63 connected in circuit with its operating winding 61. If on the other hand only electric discharge device 21 of the pair 20 and 21 conduct, then relay 59 will pick up due to the energization of its operating winding 61 through a circuit extending from positive supply conductor 36 through impedance 37, rectifier 63, contacts 66 of relay 60, conductors 69 and 70, and the anode-cathode circuit of electric discharge device 21 to the negative supply conductor 40. In this circumstance relay 60 cannot pick up because current flow through its winding is blocked by rectifier 64.

In order to maintain the energization of that relay which picked up due to anode-cathode conduction of but one of the electric discharge devices 20 and 21 each of the relays is provided with contacts 71 and 72 which upon pick up of the relay complete a circuit in shunt to that electric discharge device whose conductivity caused the relay to pick up. This last mentioned circuit is completed to conductor 40 through the contacts 73 of a reset push button switch. Unless these circuits were provided the relays would drop out because as pointed out below the operation of these relays opens the excitation circuits 14 of the electric valve means 9 and 10 thereby rendering these valve means nonconducting with the result that the electric discharge devices 20 and 21 also become nonconducting.

The pick up of either of the relays 59 and 60 opens the circuit through the operating winding of the other relay by opening its normally closed contacts 65 or 66. This is necessary to prevent operation of the other relay which would follow when the voltage of the conductors 39 and 40 reversed during the next half cycle following the half cycle which caused one of the relays to pick up and complete a holding circuit through contacts 71 or 72. Thus, once one of the relays picks up in response to half cycling of the circuit controlling means 3, it stays picked up to the exclusion of the other relay and consequently indicates that one of the electric valve means 9 and 10 failed to conduct and thereby produced the half cycling operation. Thus, if electric valve means 10 fails to conduct, for reasons given above in connection with Fig. 1, electric discharge device 21 will fail to conduct at the time electric discharge device 20 becomes conducting. This will cause relay 60 to pick up which will then seal itself in by closing its contacts 72 and prevent subsequent operation of relay 59 by opening its contacts 66. In Fig. 2 of the drawings relay 60 has been placed immediately below electric valve means 10 to show how physical association of the two may be used to show the operating condition of this electric valve means.

Each of the relays 59 and 60 is provided with contacts 73 and 74 which are series connected with one another and the contacts 18 of the manually operable control switch in the excitation circuit 14 of the electric valve means 9 and 10. Thus, operation of either of these relays will act to interrupt the flow of half cycle current to the load device and thus interrupts half cycling operation of the system.

In view of the above description of the manner in which relays 59 and 60 operate, it is considered unnecessary to describe the operation of Fig. 2 in its entirety because of the description previously given above for Fig. 1 which embodies like parts with the exception of these relays and their circuits.

It is to be noted that the system shown in Figs. 1 and 2 has a random start depending on the time when contacts 18 of the start switch are closed. Thus, it may occur that the electric valve means 10 is first to become conducting and this for reasons given above will operate a relay in these systems which will open the energizing circuit of the electric valve means 9 and 10. This will require opening contacts 18 of the start switch and operation of the reset push button switch 73 so as to make a new start with the hope of having conduction initiated through electric valve means 9. Once the system is set in operation by conduction of electric valve means 9 operation will continue until half cycle operation occurs due to failure of one of the electric valve means 9 and 10 to conduct. This operation just described is a direct result of the simple excitation circuit employed for electric valve means 9 and 10. It is of course apparent that these electric valve means may be made to conduct in leading and trailing fashion so that conduction is always initiated through electric valve means 9. Many arrangements for securing this result are well-known in the prior art and consequently have not been illustrated by further embodiments of my invention illustrating the same.

In the above description of the polarities of anode and control element voltages for electric discharge devices 19, 20 and 21, the arrangement referred to was one which made use of the end period of current flow initiated in an inductive load circuit during positive and negative half cycles. This is to be preferred although of course not necessary in the practice of my invention. The reason for its preferment is that the magnitude of load current flow may be suitably controlled by some means such as disclosed in my Patent 2,251,237, granted July 29, 1941 and assigned to the assignee of this invention. If such an arrangement is employed, the amount of current flow in the load circuit may be reduced by retarding the point in the positive half cycle of anode voltage at which current flow is initiated by a means such as disclosed in my above referred to patent. Consequently, if the polarities are such as to make use of current flow during the positive half cycle of anode voltage the control may become nondependable when the current flow is reduced to a very low value.

It is of course apparent that many variations and modifications may be made of my invention without departing from its spirit and scope. Thus, for example the leading and trailing conduction of electric discharge devices 19 and 20 may be secured in other manners than that disclosed. It is also apparent that the electric discharge devices 20 and 21 may be variously arranged in other circuits so that conduction of but one of them results in operation of the indicator 23 or of the relays 24, 59 and 60 disclosed in Figs. 1 and 2 with regard to a particular circuit arrangement.

Therefore, while I have shown and described two embodiments of my invention and suggested certain modifications thereof, it is obvious to those skilled in the art that other modifications and other changes may be made without departing from my invention in its broader aspects and I therefore aim in the appended claims to cover all such changes and modifications that fall within the true spirit and scope of my invention.

What I claim as new and desire to secure by Letters Patent of the United States is:

1. Apparatus for indicating the failure of half cycles of alternating current flow in a load circuit, said apparatus comprising a pair of supply conductors adapted for connection to an alternating voltage of the same frequency as that used to energize said load circuit, an indicator giving a different indication dependent on the reversal of the connection of its terminals with said supply conductors, a pair of electric discharge devices each having an anode, a cathode and a control element and each also having a control element circuit connected between its said cathode and its said control element, means including the anode-cathode circuits of said electric discharge devices for controlling the polarity of the connection of the terminals of said indicator with said supply conductors, means responsive to current flow of one polarity in said load circuit for introducing after a half cycle delay in the control element circuit of one of said electric discharge devices voltages which control its anode-cathode conductivity and responsive to current flow of the opposite polarity in said load circuit for introducing voltages into the control element circuit of the other of said electric discharge devices which controls its anode-cathode conductivity at the same time as the anode-cathode conductivity of said first electric discharge device is controlled, and conductors adapted to be connected to said load circuit for energizing said last mentioned means.

2. Apparatus for indicating the failure of a half cycle of alternating current flow in a load circuit, said apparatus comprising an indicator having two terminals whose connection with the voltage supply indicates the polarity of the voltage at said terminals, a pair of alternating voltage supply conductors of opposite polarity, a pair of impedances each of which has a pair of terminals, a pair of circuit controlling devices, means for connecting one terminal of each of said impedances to one of said supply conductors and the other terminal of each of said impedances in series with a different one of said circuit controlling devices to the other of said supply conductors, means for connecting each terminal of said indicator through a different one of said impedances to one of said supply conductors and through a different one of said circuit controlling devices to the other of said supply conductors, means responsive to half cycles of current flow in said load circuit of one polarity corresponding to the polarity of the initial half cycle of current flow therein for rendering one of said circuit controlling devices conducting after a half cycle delay and responsive to half cycles of current flow in said load circuit of the opposite polarity for rendering the other of said circuit controlling devices conducting at the same time that said one of said circuit controlling devices may become conducting in response to half cycles of said one polarity, and conductors adapted to be connected to said load circuit for energizing said last mentioned means.

3. Apparatus for indicating the failure of a half cycle of alternating current flow in a load circuit, said apparatus comprising an indicator having two energizing terminals, a pair of supply conductors adapted for connection to an alternating voltage of the same frequency as that used to energize said load circuit, a pair of impedances of like character, a pair of electric discharge devices each having an anode, a cathode and a control element and each also having a control element circuit connected between its said cathode and its said control element, a bridge circuit having two branches in each of which one of said electric discharge devices is connected across said supply conductors for the same polarity of anode voltage as the other of said electric discharge devices with its anode-cathode circuit connected in series with a different one of said impedances each of which is located in said branches on the same side of said electric discharge devices, means responsive to current flow of one polarity in said load circuit for introducing after a half cycle delay voltages in the control element circuit of said one of electric discharge device which renders it conducting when its anode voltage is positive, means responsive to current flow of the opposite polarity in said load circuit for introducing voltages in the control element circuit of the other of said electric discharge device which renders it conducting at the same time as said first electric discharge device when its anode voltage is also positive, conductors adapted to be connected to said load circuit for energizing said current flow responsive means, and means for connecting each terminal of said indicator through a different one of said impedances to one of said supply conductors and through a different one of said electric discharge devices to the other of said supply conductors.

4. Apparatus for indicating the failure of a half cycle of alternating current flow in a load circuit, said apparatus comprising an indicator having two energizing terminals, a pair of supply conductors adapted for connection to an alternating voltage of the same frequency as that used to energize said load circuit, a pair of impedances of like character, first, second and third electric discharge devices each of which has an anode, a cathode and a control element, means for connecting the anode-cathode circuits of said electric discharge devices with said supply conductors so that said first electric discharge device may conduct during half cycles of one polarity and said second and third electric discharge devices may conduct during half cylcles of the opposite polarity, the anode-cathode circuit through said first electric discharge devices being completed through an inductance and the anode-cathode circuits of said second and third electric discharge devices being completed respectively through a different one of said impedances which are connected on corresponding sides of said electric discharge devices, control element circuits respectively connecting the control element and cathodes of each of said electric discharge devices, means responsive to current flow of one polarity in said load circuit for introducing voltages in the control element circuit of said first electric discharge device which renders it conducting when its anode voltage is positive, means responsive to current flow of the opposite polarity in said load circuit for introducing voltages in the control element circuit of said third electric discharge device which renders it conducting when its anode voltage is positive, means responsive to conduction of said first electric discharge device continuing over into the next half cycle for introducing voltages in the control element circuit of said second electric device which renders it conducting when its anode voltage is positive, conductors adapted to be connected to said load circuit for energizing both of said current flow responsive means, and means for connecting each terminal of said indicator through a different one of said impedances to one of said supply conductors and through a different one of said second and third electric discharge devices to the other of said supply conductors.

5. In combination, alternating current supply conductors, load conductors, electric valve means each having an anode, a cathode and a control member, means for reversely connecting the anode-cathode circuits of said electric valve means in series circuit with said supply conductors and said load conductors for transmitting alternating current from said supply conductors to said load conductors when said electric valve means are conducting, control member circuits respectively connected between the control member and cathode of each of said electric valve means, means for alternately introducing control voltages in said control member circuits to render said electric valve means alternately conducting when their anode voltages are positive if said electric valve means are functioning properly, and means for indicating the failure of one of said electric valve means to conduct, said means including a pair of electric discharge devices each having an anode, a cathode and a control element and each also having a control element circuit connected between its said cathode and its said control element, a pair of impedances each having a pair of terminals, means for connecting one terminal of each of said impedances to one of said supply conductors and the other terminal thereof through the anode-cathode circuit of a different one of said electric discharge devices to the other of said supply conductors, means connected to said load circuit and responsive to the direction of current flow therein for introducing control element voltages in said control element circuits of said electric discharge devices which render said electric discharge devices conducting at the same time, the control element voltages introduced in one of said control element circuits being responsive to current flow of one polarity in said load circuit and the control element voltages introduced into the other of said control element circuits being responsive to current flow of the opposite polarity in said load circuit, and means responsive to conduction of but one of said pair of electric discharge devices for giving an indication of said condition.

6. In combination, alternating current supply conductors, load conductors, electric valve means each having an anode, a cathode and a control member, means for reversely connecting the anode-cathode circuits of said electric valve means in series circuit with said supply conductors and said load conductors for transmitting alternating current from said supply conductors to said load conductors when said electric valve means are conducting, control member circuits respective connected between the control member and cathode of each of said electric valve means, means for alternately introducing control voltages in said control member circuits to render said electric valve means alternately conducting when their anode voltages are positive if said electric valve means are functioning properly, and means for indicating the failure of one of said electric valve means to conduct, said means including a pair of electric discharge devices each having an anode, a cathode and a control element and each also having a control element circuit connected between its said cathode and its said control element, a pair of impedances, means for connecting across said supply conductors two circuits each of which includes one of said impedances connected in series with the anode-cathode circuit of a different one of said electric discharge devices each of which is poled in its own circuit in the same manner relative to said impedance and to said supply conductors, means connected to said load circuit and responsive to the direction of current flow therein for introducing control element voltages in said control element circuits of said electric discharge devices which render said electric discharge devices conducting at the same time, the control element voltages introduced in one of said control element circuits being responsive to current flow of one polarity in said load circuit and the control element voltages introduced into the other of said control element circuits being responsive to current flow of the opposite polarity in said load circuit, and means responsive to conduction of but one of said pair of electric discharge devices for giving an indication of said condition.

7. In combination, alternating current supply conductors, load conductors, electric valve means each having an anode, a cathode and a control member, means for reversely connecting the anode-cathode circuits of said electric valve means in series circuit with said supply conductors and said load conductors for transmitting alternating current from said supply conductors to said load conductors when said electric valve means are conducting, control member circuits respectively connected between the control member and cathode of each of said electric valve means, means for alternately introducing control voltages in said control member circuits to render said electric valve means alternately conducting when their anode voltages are positive if said electric valve means are functioning properly, and means for indicating the failure of one of said electric valve means to conduct, said means including first, second and third electric discharge devices each having an anode, a cathode and a control element and each also having a control element circuit connected between its said cathode and its said control element, means for connecting the anode-cathode circuits of said electric discharge devices with said supply conductors so that said second and third electric discharge devices may conduct during half cycles of one polarity and said first electric discharge device may conduct during half cycles of the opposite polarity, means responsive to alternate conduction of said electric valve means for introducing into the control element circuits of said first and third electric discharge devices control voltages which render said electric discharge devices conducting alternately when their anode voltages are positive, means responsive to the conduction of said first electric discharge device for introducing into the control element circuit of said second electric discharge device a control voltage which renders it conducting at the same time as said third electric discharge device, and means responsive to conduction of but one of said second and third electric discharge devices for giving an indication of said condition.

8. In combination, alternating current supply conductors, load conductors, electric valve means each having an anode, a cathode and a control member, means for reversely connecting the anode-cathode circuits of said electric valve means in series circuit with said supply conductors and said load conductors for transmitting alternating current from said supply conductors to said load conductors when said electric valve means are conducting, control member circuits which when completed between the control members and cathodes of said electric valve means initiate alternate conduction of said electric valve means if said electric valve means are energized and functioning properly, a pair of impedances of like character, a pair of electric discharge devices each having an anode, a cathode, and a control element, a bridge circuit having two branches in each of which one of said electric discharge devices is connected across said supply conductors for the same polarity of anode voltage as the other of said electric discharge devices with its anode-cathode circuit in series with a different one of said impedances, excitation circuits for said electric discharge devices connected between their said control elements and cathodes, means responsive to current flow initiated in said load circuit during half cycles of one polarity for introducing into the control element circuit of one of said electric discharge devices voltages which render said one of said electric discharge devices conducting during the following half cycles of opposite polarity of said load circuit when the anode voltages of said electric discharge devices are positive, means responsive to current flow initiated in said load circuit during half cycles of the opposite polarity for introducing into the control element circuit of the other of said electric discharge devices voltages which render said other of said discharge devices conducting during the same half cycles that said one of said electric discharge devices may become conducting in trailing response to half cycles of current flow in said load circuit, and a polarity indicator opposite terminals of which are connected to one of said supply conductors through the anode-cathode circuits of different ones of said electric discharge devices in said bridge circuits and to the other of said supply conductors through different ones of said impedances in said bridge circuits.

9. Apparatus responsive to the failure of a half cycle of alternating current flow in a load circuit, said apparatus comprising control conductors adapted for inclusion in a control circuit the making and breaking of which operates a circuit controlling means in said load circuit, a relay having a controlling circuit and a controlled circuit connected between said control conductors and operated to make and break the circuit between said control conductors in response to the controlled energization of its said controlling circuit, means including a pair of circuit controlling devices for energizing said controlling circuit of said relay in response to unlike conductivity of said circuit controlling devices and for deenergizing said controlling circuit of said relay in response to like conductivity of said circuit controlling devices, means responsive to half cycles of current flow in said load circuit of one polarity corresponding to the polarity of the initial half cycle of current flow therein for changing the conductivity of one of said circuit controlling devices after a half cycle delay and responsive to half cycles of current flow in said load circuit of the opposite polarity for changing in the same way the conductivity of the other of said circuit controlling devices, during the half cycle when the change in conductivity of said one of said circuit controlling devices becomes effective after said half cycle delay period, and conductors adapted to be connected to said load circuit for energizing said last mentioned means.

10. Apparatus responsive to the failure of a half cycle of alternating current flow in a load circuit, said apparatus comprising control conductors adapted for inclusion in a control circuit the making and breaking of which operates a circuit controlling means in said load circuit, a relay having a controlling circuit and a controlled circuit connected between said control conductors and operated to make and break the circuit between said control conductors in response to the controlled energization of its said controlling circuit, a pair of voltage supply conductors of opposite polarity, a pair of impedances each of which has a pair of terminals, a pair of circuit controlling devices, means for connecting one terminal of each of said impedances to one of said supply conductors and the other terminal of each of said impedances in series with a different one of said circuit controlling devices to the other of said supply conductors, means for connecting each terminal of said controlling circuit of said relay through a different one of said impedances to one of said supply conductors and through a different one of said circuit controlling devices to the other of said supply conductors, means responsive to half cycles of current flow in said load circuit of one polarity corresponding to the polarity of the initial half cycle of current flow therein for changing the conductivity of one of said circuit controlling devices after a half cycle delay and responsive to half cycles of current flow in said load circuit of the opposite polarity for changing in the same way the conductivity of the other of said circuit controlling devices, and conductors adapted to be connected to said load circuit for energizing said last mentioned means.

11. Apparatus responsive to the failure of a half cycle of alternating current flow in a load circuit, said apparatus including a pair of supply conductors adapted for connection to an alternating voltage of the same frequency as that used to energize said load circuit, a pair of impedances, a pair of electric discharge devices each of which has an anode, a cathode, a control element, and a control element circuit connected between its said cathode and its said control element, a bridge having two branches each of which is connected across said supply conductors and each of which includes one of said impedances connected in series with the anode-cathode circuit of a different one of said electric discharge devices each of which is poled in the same way relative to said supply conductors, means responsive to half cycles of current flow in said load circuit of one polarity corresponding to the polarity of the initial half cycle of current flow therein for rendering one of said electric discharge devices conducting after a half cycle delay and responsive to half cycles of current flow in said load circuit of the opposite polarity for rendering the other of said electric discharge devices conducting at the same time that said one of said electric discharge devices may become conducting in response to half cycles of said one polarity, conductors adapted to be connected to said load circuit for energizing said last mentioned means, control conductors adapted for inclusion in a control circuit the making and breaking of which operate a circuit controlling device in said load circuit, a relay having a controlling circuit and circuit controlling means operated in response to energization of its said controlling circuit, said circuit controlling means completing a circuit through said control conductors and the connection of the anode-cathode circuits of said electric discharge devices in said branches of said bridge, means for connecting said controlling circuit of said relay across said bridge for energization by an unbalance of said bridge resulting from conduction of but one of said electric discharge devices, and means responsive to operation of said relay for connecting its controlling circuit across said supply conductors and for operating its circuit controlling means to open the anode-cathode circuits of said electric discharge devices and the circuit through said control conductors.

12. Apparatus responsive to the failure of a half cycle of alternating current flow in a load circuit, said apparatus comprising control conductors adapted for inclusion in a control circuit the making and breaking of which operate a circuit controlling means in said load circuit, a relay having a controlling circuit and a controlled circuit connected between said control conductors and opened in response to energization of its said controlling circuit, a pair of voltage supply conductors adapted for connection to an alternating voltage of the same frequency as that used to energize said load circuit, a pair of impedances of like character, first, second and third electric discharge devices each of which has an anode, a cathode and a control element, means for connecting the anode-cathode circuits of said electric discharge devices with said supply conductors so that said first electric discharge device may conduct during half cycles of one polarity and said second and third electric discharge devices may conduct during half cycles of opposite polarity, the anode-cathode circuit through said first electric discharge device being completed through an inductance and the anode-cathode circuits of said second and third electric discharge devices being completed respectively through a different one of said impedances which are connected on corresponding sides of said electric discharge devices, control element circuits respectively connecting the control element and cathodes of each of said electric discharge devices, means responsive to current flow of one polarity in said load circuit for introducing voltages in the control element circuit of said first electric discharge device which renders it conducting when its anode voltage is positive, means responsive to current flow of the opposite polarity in said load circuit for introducing voltages in the control element circuit of said third electric discharge device which renders it conducting when its anode voltage is positive, means responsive to conduction of said first electric discharge device continuing over into the next half cycle for introducing a voltage in the control element circuit of said second electric device which renders it conducting when its anode voltage is positive, conductors adapted to be connected to said load circuit for energizing both of said above mentioned current flow responsive means, and means for connecting each terminal of said controlling circuit of said relay through a different one of said impedances to one of said supply conductors and through a different one of said second and third electric discharge devices to the other of said supply conductors.

13. Apparatus responsive to the failure of a half cycle of alternating current flow in a load circuit, said apparatus including a relay having contacts and means including a winding for operating said contacts, control conductors connected through contacts of said relay and adapted for inclusion in a control circuit the making and breaking of which operate a circuit controlling means in said load circuit, a pair of supply conductors adapted for connection to an alternating voltage of the same frequency as that used to energize said load circuit, a pair of impedances of like character, a pair of electric discharge devices each having an anode, a cathode and a control element and each also having a control element circuit connected between its said cathode and its said control element, a bridge circuit having two branches in each of which one of said electric discharge devices is connected across said supply conductors for the same polarity of anode voltage as the other of said electric discharge devices with its anode-cathode circuit connected in series with normally closed contacts of said relay and a different one of said impedances each of which is located in said branches on the same side of said electric discharge devices, means connecting the operating winding of said relay accross the branches of said bridge circuit to points which have substantially the same potential when both of said electric discharge devices are conducting and which also have a difference of potential sufficient to operate said relay when but one of said electric discharge devices is conducting, means responsive to half cycles of current flow in said load circuit of one polarity corresponding to the polarity of the initial half cycle of current flow therein for introducing into the control element circuit of one of said electric discharge devices voltages which will render it conducting after a half cycle delay and responsive to half cycles of current flow in said load circuit of the opposite polarity for introducing into the control element circuit of said other electric discharge device voltages which will render it conducting at the same time said one of said electric discharge devices may become conducting in response to half cycles of said one polarity, conductors adapted to be connected to said load circuit for energizing said last mentioned means, and a circuit including a normally closed reset switch and normally open contacts of said relay which when closed connect said operating winding of said relay across said supply conductor when its connection at said points in said bridge is interrupted by the opening of its said normally closed contacts located in said branches of said bridge.

14. Apparatus responsive to the failure of a half cycle of alternating current flow in a load circuit, said apparatus including a pair of relays each of which has contacts and means including a winding for operating said contacts, control conductors connected through contacts of said relays and adapted for inclusion in control circuits the making and breaking of which operate a circuit controlling means in said load circuit, a pair of supply conductors adapted for connection to an alternating voltage of the same frequency as that used to energize said load circuit, a pair of impedances of like character, a pair of electric discharge devices each having an anode, a cathode and a control element and each also having a control element circuit connected between its said cathode and its said control element, a bridge circuit having two branches in each of which one of said electric discharge devices is connected across said supply conductors for the same polarity of anode voltage as the other of said electric discharge devices with its anode-cathode circuit connected in series with a different one of said impedances each of which is located in said branches on the same side of said electric discharge devices, means connecting the operating winding of each of said relays across the branches of said bridge circuit through normally closed contacts of the other relay and reversely connected polarized means to points which have substantially the same potential when both of said electric discharge devices are conducting and which also have a difference of potential sufficient to operate one of said relays depending on the polarity of said points when but one of said electric discharge devices is conducting, means responsive to half cycles of current flow in said load circuit of one polarity corresponding to the polarity of the initial half cycle of current flow therein for introducing into the control element circuit of one of said electric discharge devices voltages which will render it conducting after a half cycle delay and responsive to half cycles of current flow in said load circuit of the opposite polarity for introducing into the control element circuit of the other of said electric discharge devices voltages which will render it conducting at the same time said one of said electric discharge devices may become conducting in response to half cycles of said one polarity, conductors adapted to be connected to said load circuit for energizing said last mentioned means, a reset switch, and means including said reset switch and normally open contacts of that relay whose operating winding was initially energized by conduction of but one of said electric discharge devices for completing a shunt circuit about the anode-cathode circuit of said electric discharge device.

15. Apparatus responsive to the failure of a half cycle of alternating current flow in a load circuit, said apparatus including a pair of supply conductors adapted for connection to an alternating voltage of the same frequency as that used to energize said load circuit, a pair of impedances, a pair of electric discharge devices each of which has an anode, a cathode and a control element and each of which also has a control element circuit connected between its said cathode and its said control element, a bridge having two branches each of which is connected across said supply conductors and each of which includes one of said impedances connected in series with the anode-cathode circuit of a different one of said electric discharge devices each of which is poled in the same way relative to said supply conductors, means responsive to half cycles of current flow in said load circuit of one polarity corresponding to the polarity of the initial half cycle of current flow therein for rendering one of said electric discharge devices conducting after a half cycle delay and responsive to half cycles of current flow in said load circuit of the opposite polarity for rendering the other of said electric discharge devices conducting at the same time that said one of said electric discharge devices may become conducting in response to half cycles of said one polarity, conductors adapted to be connected to said load circuit for energizing said last mentioned means, a pair of relays each of which is connected to said bridge for independent operation in response to a different unbalance of said bridge, one of said relays being polarized to respond to an unbalance of said bridge by conduction of one only of said electric discharge devices therein and the other of said relays being polarized to respond to an unbalance of said bridge by conduction of the other only of said discharge devices therein, control conductors adapted for inclusion in a control circuit the making and breaking of which operate a circuit controlling means in said load circuit, means responsive to the operation of either of said relays for controlling the circuit through said control conductors, for opening the energizing circuit of the other of said relays, and for completing a holding circuit whereby its own energization is maintained, and resetting means connected in said holding circuits of said relays and operable to open said holding circuits.

16. In combination alternating current supply conductors, load conductors, electric valve means each having an anode, a cathode and a control member, means for reversely connecting the anode-cathode circuits of said electric valve means in series circuit with said supply conductors and said load conductors for transmitting alternating current from said supply conductors to said load conductors when said electric valve means are conducting, control member circuits respectively connected between said control member and said cathode of each of said electric valve means, a relay having a controlling circuit and a controlled circuit operated in response to the energization and the deenergization of its controlling circuit, and means including the controlled circuit of said relay for controlling the energization of said control member circuits of both of said electric valve means in response to the failure of one of said electric valve means to conduct when its anode is positive and its control element circuit is energized for conduction, said means including a pair of electric discharge devices each having an anode, a cathode and a control element and each also having a control element circuit connected between its said cathode and its said control element, a pair of impedances, means for connecting across said supply conductors two circuits each of which includes one of said impedances connected in series with the anode-cathode circuit of a different one of said electric discharge devices each of which is poled in its own circuit in the same manner relative to said impedance and to said supply conductors, means connected to said load circuit and responsive to the direction of current flow therein for introducing control element voltages in said control element circuits of said electric discharge devices which control the conductivity of said electric discharge devices at the same time, the control element voltages introduced in one of said control element circuits being responsive to current flow of one polarity in said load circuit and the control element voltages introduced into the other of said control element circuits being responsive to current flow of the opposite polarity in said load circuit, and means responsive to conduction of but one of said pair of electric discharge devices for controlling the energization of said controlling circuit of said relay.

17. In combination alternating current supply conductors, load conductors, electric valve means each having an anode, a cathode and a control member, means for reversely connecting the anode-cathode circuits of said electric valve means in series circuit with said supply conductors and said load conductors for transmittnig alternating current from said supply conductors to said load conductors when said electric valve means are conducting, control member circuits respectively connected between the control member and cathode of each of said electric valve means, a relay having a controlling circuit and a controlled circuit operated in response to energization of its said controlling circuit, and means including the controlled circuit of said relay for deenergizing the control member circuits of both of said electric valve means in response to the failure of one of said electric valve means to conduct when its anode is positive and its control element circuit is energized for conduction, said means including a pair of electric discharge devices each having an anode, a cathode and a control element and each also having a control element circuit connected between its said cathode and its said control element, a pair of impedances each having a pair of terminals, means for connecting one terminal of each of said impedances to one of said supply conductors and the other terminal thereof through the anode-cathode circuit of a different one of said electric discharge devices to the other of said supply conductors, means connected to said load circuit and responsive to the direction of current flow therein for introducing control element voltages in said control element circuits of said electric discharge devices which render said electric discharge devices conducting at the same time, the control element voltages introduced in one of said control element circuits being responsive to current flow of one polarity in said load circuit and the control element voltages introduced into the other of said control element circuits being responsive to current flow of the opposite polarity in said load circuit, and means responsive to conduction of but one of said pair of electric discharge devices for energizing said controlling circuit of said relay.

18. In combination alternating current supply conductors, load conductors, electric valve means each having an anode, a cathode and a control member, means for reversely connecting the anode-cathode circuits of said electric valve means in series circuit with said supply conductors and said load conductors for transmitting alternating current from said supply conductors to said load conductors when said electric valve means are conducting, control member circuits respectively connected between said control member and said cathode of each of said electric valve means, a relay having a controlling circuit and a controlled circuit operated in response to energization of its controlling circuit, and means including the controlled circuit of said relay for deenergizing the control member circuits of both of said electric valve means in response to the failure of one of said electric valve means to conduct when its anode is positive and its control element circuit is energized for conduction, said means including first, second, and third electric discharge devices each having an anode, a cathode and a control element circuit connected between its said cathode and its said control element, means for connecting the anode-cathode circuits of said electric discharge devices with said supply conductors so that said second and third electric discharge devices may conduct during half cycles of one polarity and said first electric discharge device may conduct during half cycles of the opposite polarity, means responsive to alternate conduction of said electric valve means for introducing into the control element circuits of said first and third electric discharge devices control voltages which render said electric discharge devices conducting alternately when their anode voltages are positive, means responsive to the conduction of said first electric discharge device for introducing into the control element circuit of said second electric discharge device a control voltage which renders it conducting at the same time as said third electric discharge device, and means responsive to conduction of but one of said second and third electric discharge devices for controlling the energization of said controlling circuit of said relay.

19. In combination alternating current supply conductors, load conductors, electric valve means each having an anode, a cathode and a control member, means for reversely connecting the anode-cathode circuits of said electric valve means in series circuit with said supply conductors and said load conductors for transmitting alternating current from said supply conductors to said load conductors when said electric valve means are conducting, a pair of relays each of which has contacts and means including a winding for operating said contacts, control member circuits respectively connected between the said control members and said cathodes of each of said electric valve means through contacts of each of said relays connected in series with one another, means for alternately introducing control voltages in said control member circuits to render said electric valve means alternately conducting when their anode voltages are positive if said electric valve means are functioning properly, a pair of impedances of like character, first, second and third electric discharge devices each having an anode, a cathode and a control element and each also having a control element circuit connected between its said cathode and its said control element, means for connecting the anode-cathode circuits of said electric discharge devices with said supply conductors so that said first electric discharge device may conduct during half cycles of one polarity and said second and third electric discharge devices may conduct during half cycles of the opposite polarity, means for introducing into the control element circuit of said second electric discharge device when its anode voltage is positive control voltages which render said second electric discharge device conducting in trailing response to conduction of said first electric discharge device during the preceding half cycle when its anode voltage was positive, a bridge circuit having two branches in each of which one of said second and third electric discharge devices is connected across said supply conductors for the same polarity of anode voltage as the other of said electric discharge devices with its anode-cathode circuit connected in series with a different one of said impedances each of which is located in said branches on the same side of said electric discharge devices, means connecting the operating winding of each of said relays across the branches of said bridge circuit through normally closed contacts of the other relay and reversely connected polarized means to points which have substantially the same potential when both of said electric discharge devices are conducting and which also have a difference of potential sufficient to operate either one of said relays depending on the polarity of said points when but one of said electric discharge devices is conducting, means connected with said load circuit and responsive to half cycles of current flow in said load circuit of one polarity corresponding to the polarity of the initial half cycle of current flow therein for introducing into the control element circuit of said first electric discharge device voltages which will render it conducting when its anode voltage is positive and responsive to half cycles of current flow in said load circuit of the opposite polarity for introducing into the control element circuit of said third electric discharge device voltages which will render it conducting when its anode voltage is positive and at the same time said second electric discharge device may become conducting in trailing response to conduction of said first electric discharge device, a reset switch, and means including said reset switch and normally open contacts of that relay whose operating winding was energized by conduction of but one of said second and third electric discharge devices for completing a shunt circuit about the anode-cathode circuit of said one of said electric discharge devices.

MAURICE E. BIVENS.

REFERENCES CITED

The following references are of record in the file of this patent:

UNITED STATES PATENTS

| Number | Name | Date |
| --- | --- | --- |
| 2,285,912 | De Monte | June 9, 1942 |
| 2,394,084 | Livingston | Feb. 5, 1946 |
| 2,394,087 | Mahoney | Feb. 5, 1946 |
| 2,438,742 | Farrow | Mar. 30, 1948 |
| 2,492,343 | Zavales | Dec. 27, 1949 |